United States Patent
Liu et al.

(10) Patent No.: US 12,225,483 B2
(45) Date of Patent: Feb. 11, 2025

(54) MULTIPLEXING REFERENCE SIGNALS WITH SIDELINK SYNCHRONIZATION SIGNAL BLOCK

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/695,549

(22) Filed: Mar. 15, 2022

(65) Prior Publication Data
US 2023/0300761 A1 Sep. 21, 2023

(51) Int. Cl.
*H04W 56/00* (2009.01)
*H04W 72/0446* (2023.01)
*H04W 72/20* (2023.01)
*H04W 92/18* (2009.01)

(52) U.S. Cl.
CPC ..... *H04W 56/001* (2013.01); *H04W 72/0446* (2013.01); *H04W 72/20* (2023.01); *H04W 92/18* (2013.01)

(58) Field of Classification Search
CPC ........... H04W 56/001; H04W 72/0446; H04W 72/20; H04W 92/18
See application file for complete search history.

(56) References Cited

U.S. PATENT DOCUMENTS

| | | | |
|---|---|---|---|
| 2020/0245272 A1* | 7/2020 | Hong | H04W 56/001 |
| 2021/0360520 A1* | 11/2021 | Chen | H04W 56/001 |
| 2023/0124916 A1* | 4/2023 | Lindholm | H04L 5/0051 370/329 |

* cited by examiner

*Primary Examiner* — Jamal Javaid
(74) *Attorney, Agent, or Firm* — ArentFox Schiff LLP

(57) ABSTRACT

In the context of a slot of a sidelink (SL) communication frame of a user equipment (UE), the slot is configured with a resource element allocation comprising an SL synchronization signal block (S-SSB) occupying a plurality of less than all symbols of the slot, and a plurality of less than all subcarriers of a channel of the slot. The UE determines that an occupied channel bandwidth (OCB) constraint for the slot across the channel will not be met with the resource element allocation. The UE then multiplexes, in response to the determining, a reference signal (RS) across the symbols occupied by the S-SSB in a plurality of resource blocks of the channel not occupied by the S-SSB to meet the OCB constraint. The UE then transmits the slot with the S-SSB and the multiplexed RS.

30 Claims, 11 Drawing Sheets

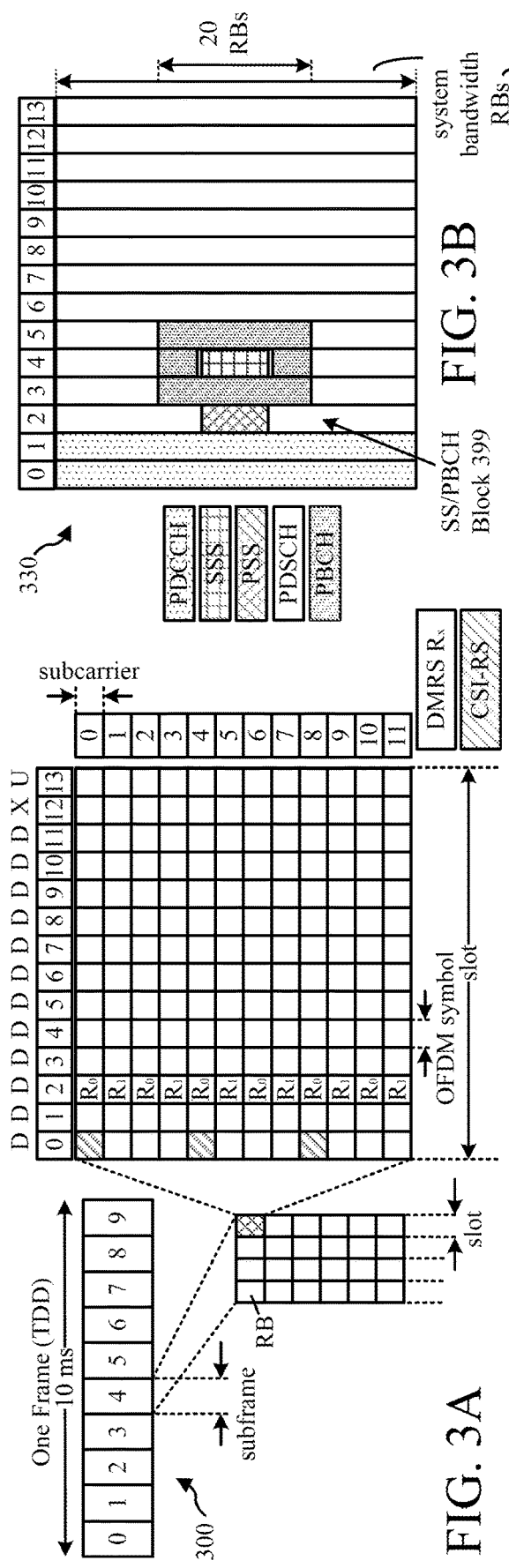
FIG. 3A
FIG. 3B
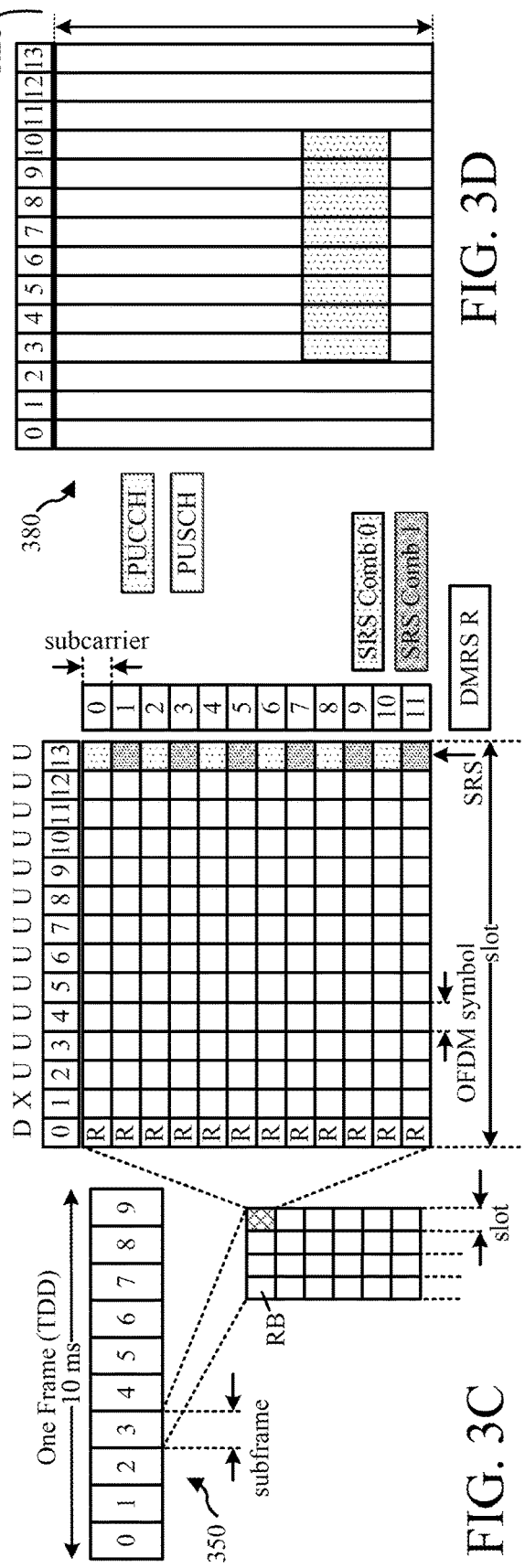
FIG. 3C
FIG. 3D

MULTIPLEXING REFERENCE SIGNALS WITH SIDELINK SYNCHRONIZATION SIGNAL BLOCK

TECHNICAL FIELD

The present disclosure relates generally to communication systems, and more particularly in some examples, to multiplexing reference signals with sidelink synchronization signal block for sidelink in unlicensed spectrum.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. Such technology finds use in the context of a slot of a sidelink (SL) communication frame of a user equipment (UE). The slot is configured with a resource element allocation comprising an SL synchronization signal block (S-SSB) occupying a plurality of less than all symbols of the slot, and a plurality of less than all subcarriers of a channel of the slot. In such technology, the UE determines that an occupied channel bandwidth (OCB) constraint for the slot across the channel will not be met with the resource element allocation. The UE then multiplexes, in response to the determining, a reference signal (RS) across the symbols occupied by the S-SSB in a plurality of resource blocks of the channel not occupied by the S-SSB to meet the OCB constraint. The UE then transmits the slot with the S-SSB and the multiplexed RS.

In some examples, the channel is in an unlicensed frequency band. In some examples, the S-SSB is configured across four (4) contiguous symbols and one of (i) eleven resource blocks (RBs) in frequency and (ii) twenty RBs in frequency. In some examples, the RS is a Channel Status Information RS (CSI-RS). In some such examples, multiplexing includes allocating one CSI-RS to one resource per symbol occupied by the S-SSB in a plurality of resource blocks of the channel not occupied by the S-SSB. In some such examples, multiplexing includes allocating a given single-symbol CSI-RS with a given subcarrier pattern in each of the symbols occupied by the S-SSB. In some such examples, the single-symbol CSI-RS is one of a comb-12, comb-6, comb-4, and comb-3 pattern CSI-RS. In some examples SL Control Information (SCI) of the frame indicates the CSI-RS multiplexed into the S-SSB symbols. In some examples, the S-SSB punctures a Physical Sidelink Shared Channel (PSSCH) of the frame and an amplitude scaling factor is applied to the CSI-RS based on an amplitude scaling factor of the PSSCH.

In some examples, the UE identifies, prior to the transmitting, one or more unoccupied symbols between a last symbol of a Physical Sidelink Control Channel (PSCCH) of the frame and a first symbol of the S-SSB. In such examples, the UE rate matches, prior to the transmitting, at least a portion of a Physical Sidelink Shared Channel (PSSCH) of the frame into the identified one or more unoccupied symbols. In such examples, transmitting the slot further comprises transmitting the slot with the rate matched at least a portion of the PSSCH.

In some examples, prior to transmitting, the UE determines that a Physical Sidelink Shared Channel (PSSCH) of the frame carries SL Control Information (SCI) only and no data transport blocks (TBs). In such examples, the UE indicates in SCI-1 of a Physical Sidelink Control Channel (PSCCH) of the frame the CSI-RS multiplexed into the S-SSB symbols. In such examples, transmitting the slot further includes transmitting the slot with the indication in SCI-1 of a Physical Sidelink Control Channel (PSCCH) of the frame the CSI-RS multiplexed into the S-SSB symbols.

In some examples, the RS is a Tracking RS (TRS). In some such examples, multiplexing comprises allocating a given single-symbol TRS with a given subcarrier pattern in each of the symbols occupied by the S-SSB. In some such examples, the single-symbol TRS is a comb-4 pattern TRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3A, FIG. 3B, FIG. 3C, and FIG. 3D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
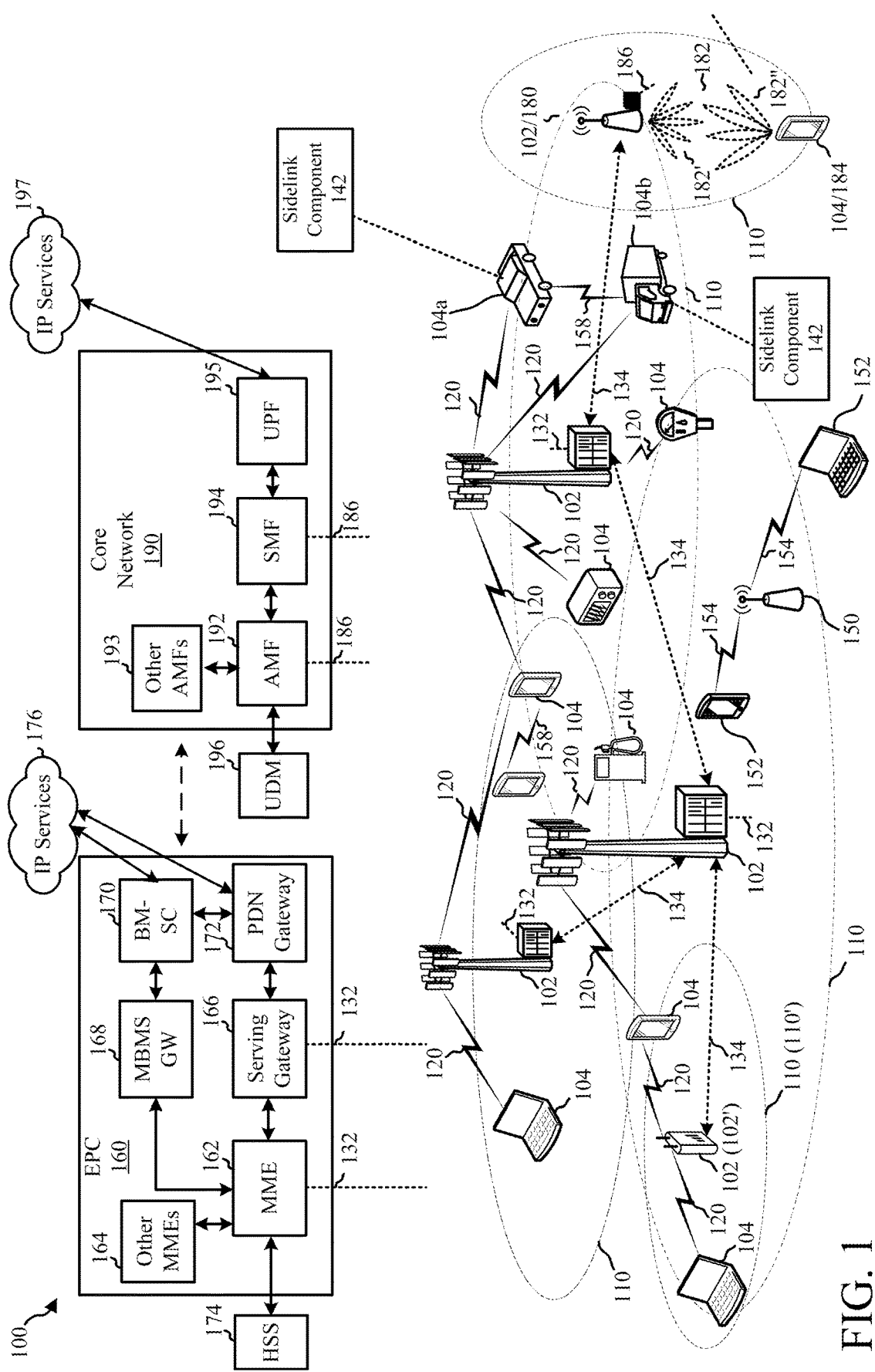
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

"Sidelink" (SL) refers to direct communication between terminal nodes or User Equipments (UEs), such as smart phones, IoT devices, and vehicles, without the data going through the wireless communication system network. The SL communication link may use one or more sidelink channels, such as a physical sidelink broadcast channel (PSBCH), a physical sidelink discovery channel (PSDCH), a physical sidelink shared channel (PSSCH), and a physical sidelink control channel (PSCCH). These channels can be carried in a frame/subframe structure (described in detail below in conjunction with FIG. 3A-FIG. 3D) that can be represented as "symbols" over time on one axis, and "resource blocks" (RBs) across frequency (e.g., a number of subcarriers) on another axis. SL communications can use portions of an unlicensed spectrum in the 5-6 MHz range, where principles such as "listen-before-talk" (LBT) are be used.

Use of the unlicensed (though allocated) portion of the frequency spectrum is subject to various constraints, such as the Occupied Channel Bandwidth (OCB) constraint. OCB may be defined as the bandwidth containing 99% of the signal power of a channel and, in certain regions, it should be larger than a percentage of the Nominal Channel Bandwidth (NCB). This requires devices using the unlicensed spectrum to use major part of the channel bandwidth when accessing a channel. For example, for the 5 GHz band, the OCB may be required to be at least 70% of the NCB.

In 5G NR, a primary synchronization signal (PSS) and a secondary synchronization signal (SSS) are used by a UE to determine, inter alia, subframe/symbol timing and a physical layer identity. In addition, the PSBCH, which carries a master information block (MIB), may be logically grouped with the PSS and SSS to form a synchronization signal (SS)/PBCH block—or Synchronization Signal Block (SSB). During communication over SL, an SL Synchronization Signal (S-SSB) is used.

The UE-to-base station NR SSB—four (4) symbols in time by eleven (11) or twenty (20) RBs in frequency—can be used as the S-SSB in the unlicensed portion of the spectrum. Such an approach allows PSCCH and PSSCH to be multiplexed with SSB to satisfy the OCB constraint. Placement of the S-SSB to avoid overlapping with PSCCH (containing some system control information (SCI), SCI-1 in particular) and the SCI portion of PSSCH (SCI-2) is required so that both portions of SCI can be decoded without knowing the presence of SSB. The SCI can be used to indicate the presence of SSB and the symbols/RBs where SSB is located in a subframe.

In some instances, the non-SCI-2 portion of PSSCH is scant (e.g., small data transport blocks (TBs)), or even empty. In such instances, it may be difficult to meet the OCB constraint. The technology disclosed herein uses reference signals (RSs) to facilitate meeting the OCB constraint in SL where the non-SCI-2 portion of PSSCH is scant, or even empty. In particular, some examples of the technology disclosed herein include a fixed 4-symbol interlaced channel state information reference signal (CSI-RS) or tracking reference signal (TRS) pattern, or a four contiguous CSI-RS resources in the S-SSB symbols when a transmitter UE has no/little data to transmit. Standalone 4-symbol interlaced CSI-RS/TRS can rate match around S-SSB to help the UE to satisfy the OCB constraint. The 4-symbol CSI-RS/TRS pattern/configuration also can help to maintain phase continuity across CSI-RS/TRS symbols. The UE can revert to a regular CSI-RS/TRS pattern if multiplexed with PSSCH data REs in S-SSB symbols. The TRS can be wideband across multiple RB-sets if needed.

SCI-2 or small TBs can rate match to fill the gap between PSCCH and S-SSB to avoid additional LBT. SCI-2 can carry CSI-RS/TRS triggers, transmitter/receiver identity, and an S-SSB location bitmap. The SCI can be used to trigger the CSI-RS/TRS transmission, e.g., if the UE has no/little data to transmit in PSSCH, a 4-symbol CSI-RS/TRS can be multiplexed with S-SSB; and if the UE has data to transmit in PSSCH, the UE can use regular interlaced CSI-RS.

In aspects of the present disclosure, methods, non-transitory computer readable media, and apparatuses are provided. The technology disclosed herein includes method, apparatus, and computer-readable media including instructions for wireless communication. Such technology finds use in the context of a slot of a sidelink (SL) communication frame of a user equipment (UE). The slot is configured with a resource element allocation comprising an SL synchronization signal block (S-SSB) occupying a plurality of less than all symbols of the slot, and a plurality of less than all subcarriers of a channel of the slot. In such technology, the UE determines that an occupied channel bandwidth (OCB) constraint for the slot across the channel will not be met with the resource element allocation. The UE then multiplexes, in response to the determining, a reference signal (RS) across the symbols occupied by the S-SSB in a plurality of resource blocks of the channel not occupied by the S-SSB to meet the OCB constraint. The UE then transmits the slot with the S-SSB and the multiplexed RS.

In some examples, the channel is in an unlicensed frequency band. In some examples, the S-SSB is configured across four (4) contiguous symbols and one of (i) eleven resource blocks (RBs) in frequency and (ii) twenty RBs in frequency. In some examples, the RS is a Channel Status Information RS (CSI-RS). In some such examples, multiplexing includes allocating one CSI-RS to one resource per symbol occupied by the S-SSB in a plurality of resource blocks of the channel not occupied by the S-SSB. In some such examples, multiplexing includes allocating a given single-symbol CSI-RS with a given subcarrier pattern in each of the symbols occupied by the S-SSB. In some such examples, the single-symbol CSI-RS is one of a comb-12, comb-6, comb-4, and comb-3 pattern CSI-RS. In some examples SL Control Information (SCI) of the frame indicates the CSI-RS multiplexed into the S-SSB symbols. In some examples, the S-SSB punctures a Physical Sidelink Shared Channel (PSSCH) of the frame and an amplitude scaling factor is applied to the CSI-RS based on an amplitude scaling factor of the PSSCH.

In some examples, the UE identifies, prior to the transmitting, one or more unoccupied symbols between a last symbol of a Physical Sidelink Control Channel (PSCCH) of the frame and a first symbol of the S-SSB. In such examples, the UE rate matches, prior to the transmitting, at least a portion of a Physical Sidelink Shared Channel (PSSCH) of the frame into the identified one or more unoccupied symbols. In such examples, transmitting the slot further comprises transmitting the slot with the rate matched at least a portion of the PSSCH.

In some examples, prior to transmitting, the UE determines that a Physical Sidelink Shared Channel (PSSCH) of the frame carries SL Control Information (SCI) only and no data transport blocks (TBs). In such examples, the UE indicates in SCI-1 of a Physical Sidelink Control Channel (PSCCH) of the frame the CSI-RS multiplexed into the S-SSB symbols. In such examples, transmitting the slot further includes transmitting the slot with the indication in SCI-1 of a Physical Sidelink Control Channel (PSCCH) of the frame the CSI-RS multiplexed into the S-SSB symbols.

In some examples, the RS is a Tracking RS (TRS). In some such examples, multiplexing comprises allocating a given single-symbol TRS with a given subcarrier pattern in each of the symbols occupied by the S-SSB. In some such examples, the single-symbol TRS is a comb-4 pattern TRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The technology disclosed herein includes method, apparatus, and computer-readable media including instructions for wireless communication. Such technology finds use in the context of a slot of a sidelink (SL) communication frame, such as over link 158, of a UE, such as UE 104a and UE 104b. The slot is configured with a resource element allocation comprising an SL synchronization signal block (S-SSB) occupying a plurality of less than all symbols of the slot, and a plurality of less than all subcarriers of a channel of the slot. In such technology, the UE 104a determines that an occupied channel bandwidth (OCB) constraint for the slot across the channel will not be met with the resource element allocation. The UE 104a then multiplexes, in response to the determining, a reference signal (RS) across the symbols occupied by the S-SSB in a plurality of resource blocks of the channel not occupied by the S-SSB to meet the OCB constraint. The UE 104a then transmits the slot with the S-SSB and the multiplexed RS.

In some examples, the channel is in an unlicensed frequency band. In some examples, the S-SSB is configured across four (4) contiguous symbols and one of (i) eleven resource blocks (RBs) in frequency and (ii) twenty RBs in frequency. In some examples, the RS is a Channel Status Information RS (CSI-RS). In some such examples, multiplexing includes allocating one CSI-RS to one resource per symbol occupied by the S-SSB in a plurality of resource blocks of the channel not occupied by the S-SSB. In some such examples, multiplexing includes allocating a given single-symbol CSI-RS with a given subcarrier pattern in each of the symbols occupied by the S-SSB. In some such examples, the single-symbol CSI-RS is one of a comb-12, comb-6, comb-4, and comb-3 pattern CSI-RS. In some examples SL Control Information (SCI) of the frame indicates the CSI-RS multiplexed into the S-SSB symbols. In some examples, the S-SSB punctures a Physical Sidelink Shared Channel (PSSCH) of the frame and an amplitude scaling factor is applied to the CSI-RS based on an amplitude scaling factor of the PSSCH.

In some examples, the UE 104a identifies, prior to the transmitting, one or more unoccupied symbols between a last symbol of a Physical Sidelink Control Channel (PSCCH) of the frame and a first symbol of the S-SSB. In such examples, the UE 104a rate matches, prior to the transmitting, at least a portion of a Physical Sidelink Shared Channel (PSSCH) of the frame into the identified one or more unoccupied symbols. In such examples, transmitting the slot further comprises transmitting the slot with the rate matched at least a portion of the PSSCH.

In some examples, prior to transmitting, the UE 104a determines that a Physical Sidelink Shared Channel (PSSCH) of the frame carries SL Control Information (SCI) only and no data transport blocks (TBs). In such examples, the UE 104a indicates in SCI-1 of a Physical Sidelink Control Channel (PSCCH) of the frame the CSI-RS multiplexed into the S-SSB symbols. In such examples, transmitting the slot further includes transmitting the slot with the indication in SCI-1 of a Physical Sidelink Control Channel (PSCCH) of the frame the CSI-RS multiplexed into the S-SSB symbols.

In some examples, the RS is a Tracking RS (TRS). In some such examples, multiplexing comprises allocating a given single-symbol TRS with a given subcarrier pattern in each of the symbols occupied by the S-SSB. In some such examples, the single-symbol TRS is a comb-4 pattern TRS.

The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short-range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
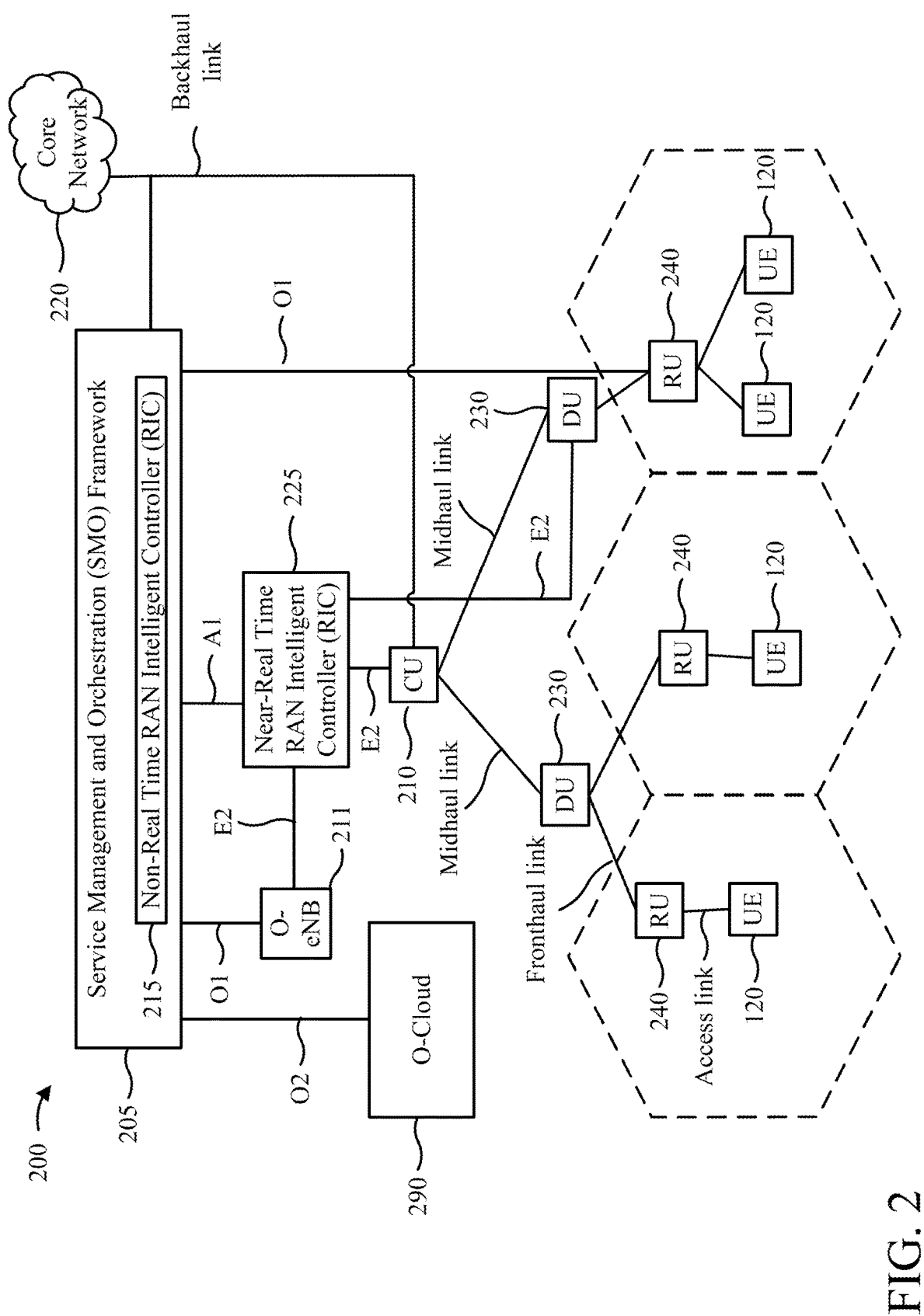
FIG. 2 is a diagram illustrating an example disaggregated base station 200 architecture

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT MC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the non-RT MC 215 or the Near-RT MC 225 may be configured to tune RAN behavior or performance. For example, the Non-RT MC 215 may monitor long-term trends and patterns for performance and employ AI/ML models to perform corrective actions through the SMO Framework 205 (such as reconfiguration via 01) or via creation of RAN management policies (such as A1 policies).

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 4:
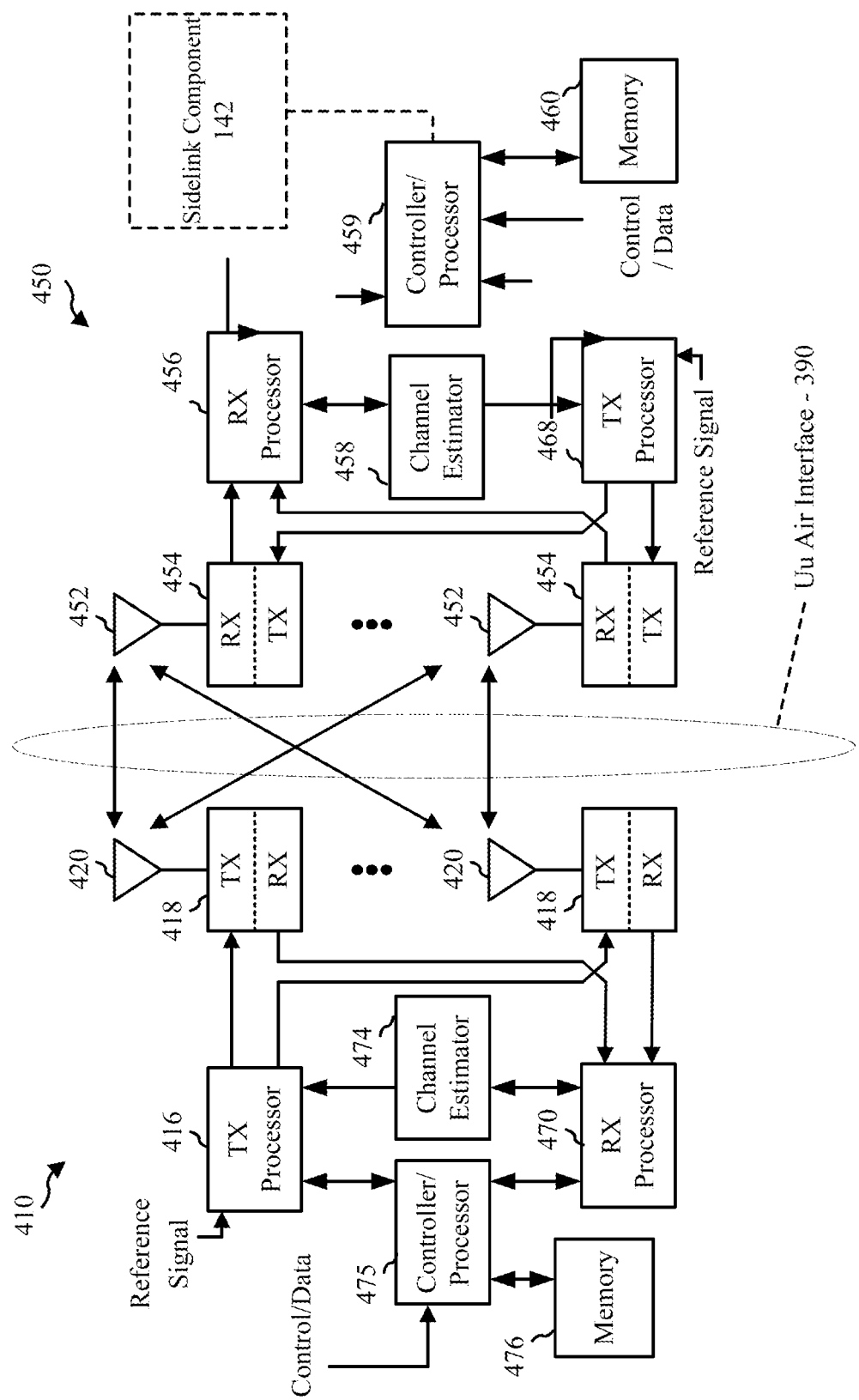
FIG. 4 is a diagram illustrating a base station and user equipment (UE) in an access network, in accordance with examples of the technology disclosed herein.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and de-interleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations. As described elsewhere herein, the interface between a UE 450 and a base station 410 can be referred to as a "Uu" interface 490.

Continuing to refer to FIG. 4, and continuing to refer to prior figures for context, in certain aspects, the technology disclosed herein is method, apparatus, and computer-readable media including instructions for wireless communication. Such technology finds use in the context of a slot of a sidelink (SL) communication frame of a UE, such as UE 450. The slot is configured with a resource element allocation comprising an SL synchronization signal block (S-SSB) occupying a plurality of less than all symbols of the slot, and a plurality of less than all subcarriers of a channel of the slot. In such technology, the UE, for example by using controller/processor 459 and memory 460, determines that an occupied channel bandwidth (OCB) constraint for the slot across the channel will not be met with the resource element allocation. The UE 450 (for example by using controller/processor 459, memory 460, and TX processor 468) then multiplexes, in response to the determining, a reference signal (RS) across the symbols occupied by the S-SSB in a plurality of resource blocks of the channel not occupied by the S-SSB to meet the OCB constraint. The UE 450 (for example by using controller/processor 459, memory 460, and TX processor 468) then transmits the slot with the S-SSB and the multiplexed RS.

In some examples, the channel is in an unlicensed frequency band. In some examples, the S-SSB is configured across four (4) contiguous symbols and one of (i) eleven resource blocks (RBs) in frequency and (ii) twenty RBs in frequency. In some examples, the RS is a Channel Status Information RS (CSI-RS). In some such examples, multiplexing includes allocating one CSI-RS to one resource per symbol occupied by the S-SSB in a plurality of resource blocks of the channel not occupied by the S-SSB. In some such examples, multiplexing includes allocating a given single-symbol CSI-RS with a given subcarrier pattern in each of the symbols occupied by the S-SSB. In some such examples, the single-symbol CSI-RS is one of a comb-12, comb-6, comb-4, and comb-3 pattern CSI-RS. In some examples SL Control Information (SCI) of the frame indicates the CSI-RS multiplexed into the S-SSB symbols. In some examples, the S-SSB punctures a Physical Sidelink Shared Channel (PSSCH) of the frame and an amplitude scaling factor is applied to the CSI-RS based on an amplitude scaling factor of the PSSCH.

In some examples, the UE450 (for example by using controller/processor 459, memory 460, and TX processor 468) identifies, prior to the transmitting, one or more unoccupied symbols between a last symbol of a Physical Sidelink Control Channel (PSCCH) of the frame and a first symbol of the S-SSB. In such examples, the UE450 (for example by using controller/processor 459, memory 460, and TX processor 468) rate matches, prior to the transmitting, at least a portion of a Physical Sidelink Shared Channel (PSSCH) of the frame into the identified one or more unoccupied symbols. In such examples, transmitting the slot further comprises transmitting the slot with the rate matched at least a portion of the PSSCH.

In some examples, prior to transmitting, the UE450 (for example by using controller/processor 459, memory 460, and TX processor 468) determines that a Physical Sidelink Shared Channel (PSSCH) of the frame carries SL Control Information (SCI) only and no data transport blocks (TBs). In such examples, the UE indicates in SCI-1 of a Physical Sidelink Control Channel (PSCCH) of the frame the CSI-RS multiplexed into the S-SSB symbols. In such examples, transmitting the slot further includes transmitting the slot with the indication in SCI-1 of a Physical Sidelink Control Channel (PSCCH) of the frame the CSI-RS multiplexed into the S-SSB symbols.

In some examples, the RS is a Tracking RS (TRS). In some such examples, multiplexing comprises allocating a given single-symbol TRS with a given subcarrier pattern in each of the symbols occupied by the S-SSB. In some such examples, the single-symbol TRS is a comb-4 pattern TRS.

Figure 5:
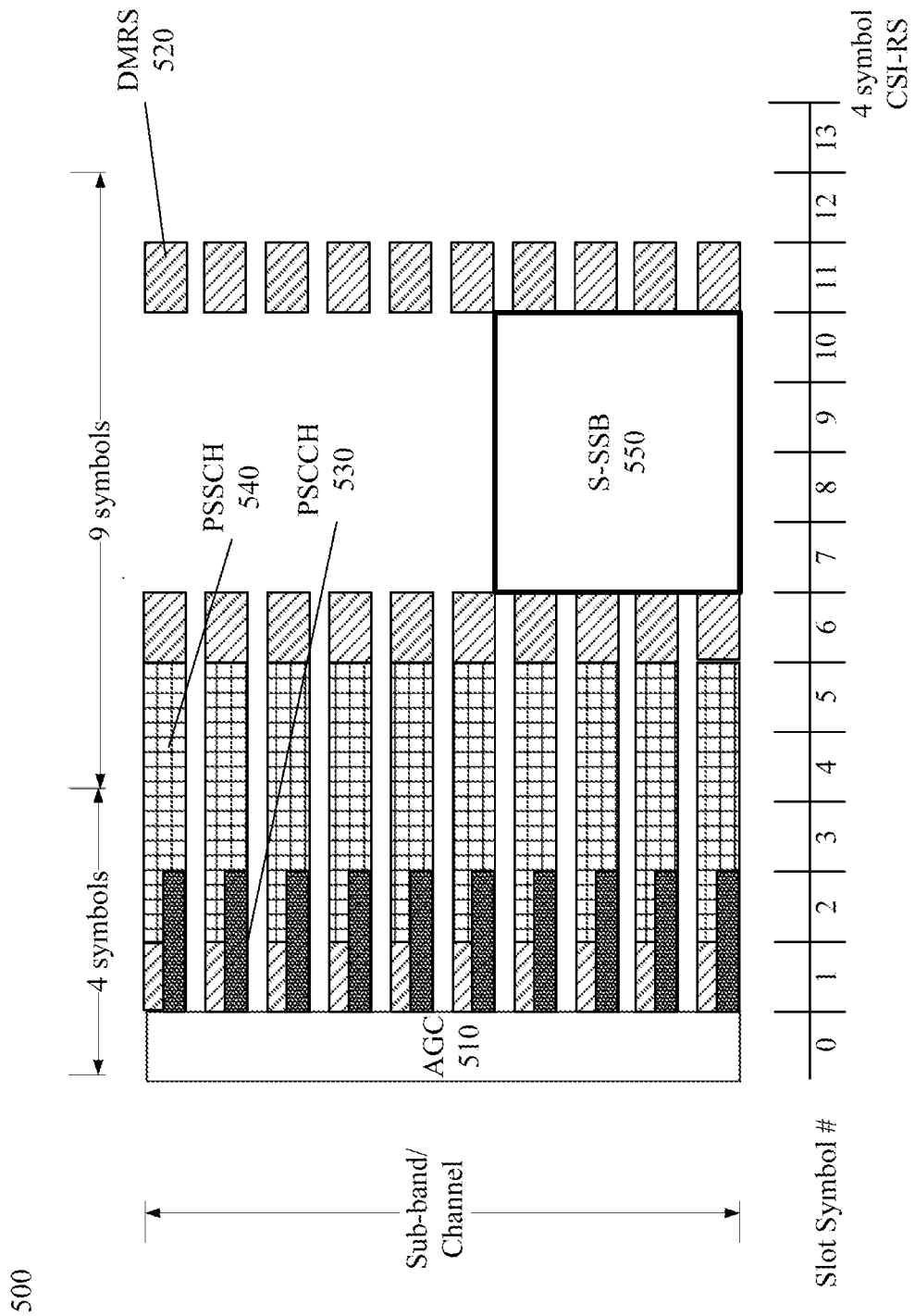
FIG. 5 illustrates a portion of a fourteen (14) symbol slot, in accordance with examples of the technology disclosed herein.

FIG. 5 illustrates a portion of an example fourteen (14) symbol slot 500, in accordance with examples of the technology disclosed herein. In FIG. 5, the last two symbols (symbol #12 and symbol #13 of symbols #0-#13) of the slot are not shown, and can be a transmit/receive gap or can be occupied by the PSSCH. Slot 500 is dimensioned in time as one slot, and dimensioned in frequency as one sub-band or channel. As described above, slot 500 includes one-symbol wide resource blocks (RBs) (also referred to as physical RBs (PRBs)) that each extend 12 consecutive subcarriers in frequency. Each RB carries a plurality of resource elements (REs), e.g., twelve one-symbol×one-subcarrier REs as shown in FIG. 3. The number of bits carried by each RE depends on the modulation scheme.

Slot 500 includes automatic gain control (AGC) 510 RBs in symbol #0 of the slot 500. Symbol #1 of the slot carries the first DMRS 520 of the slot 500 and a portion of PSCCH 530. As noted above, PSCCH 530 includes SCI-1, a first part of system control information that can be used to indicate the pattern and location of some reference signals used to meet the OCB requirement. Symbol #2 carries the remainder of PSCCH 530 and part of PSSCH 540. As noted above, PSSCH 540 includes SCI-2, the second part of system control information, which can also be used to carry information about the reference signals used to meet the OCB requirement. Symbol #3 through symbol #5 (the symbol before the second DMRS 520) can carry further portions of PSSCH 540. While symbol #6 appears to be fully occupied by the second DMRS 520 of the slot 500, DMRS typically will not occupy all the REs of the symbol that carries it. In some examples, other channels such as PSSCH 540 can extend into the DMRS-carrying symbol. In some examples herein, PSSCH 540 carries only SCI-2 and does not extend to the symbol before the second DMRS 520. Symbol #7 through Symbol #10 carry a four (4) symbol by twenty (20) RB S-SSB 550—an eleven (11) RB S-SSB is also possible. The location of the S-SSB can vary, but in the example, S-SSB 550 is placed between the second and third DMRS 520 symbols. As mentioned earlier, especially when PSSCH 540 carries little or no non-SCI-2 REs, slot 500 may not meet the OCB requirement.

Figure 6:
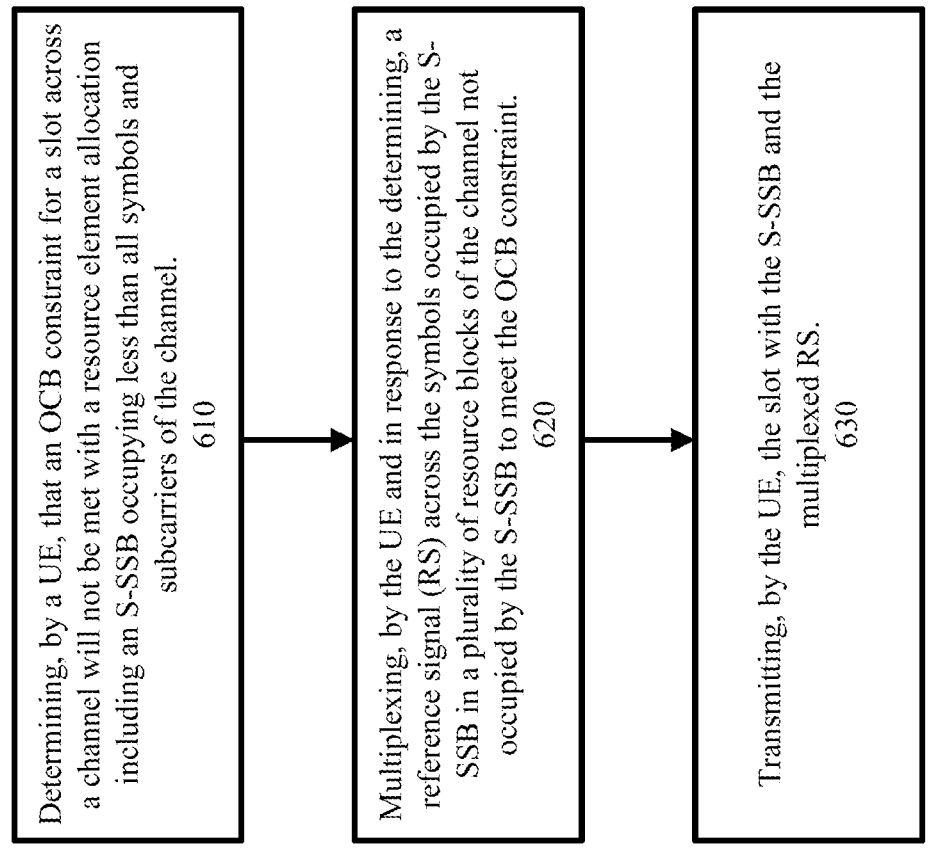
FIG. 6 is a flow diagram illustrating methods of wireless communication, in accordance with examples of the technology disclosed herein.

Referring to FIG. 6, and continuing to refer to prior figures for context, methods 600 for wireless communication are illustrated, in accordance with examples of the technology disclosed herein. In such methods, the UE determines that an occupied channel bandwidth (OCB) constraint for the slot across the channel will not be met with the resource element allocation—Block 610. In a continuing example, slot 500 is configured by a UE 104a (in SL communication with UE 104b over SL 158) with a resource element allocation comprising S-SSB 550 occupying a plurality of less than all symbols of the slot 500, and a plurality of less than all subcarriers of a channel of the slot 500.

Figure 11:
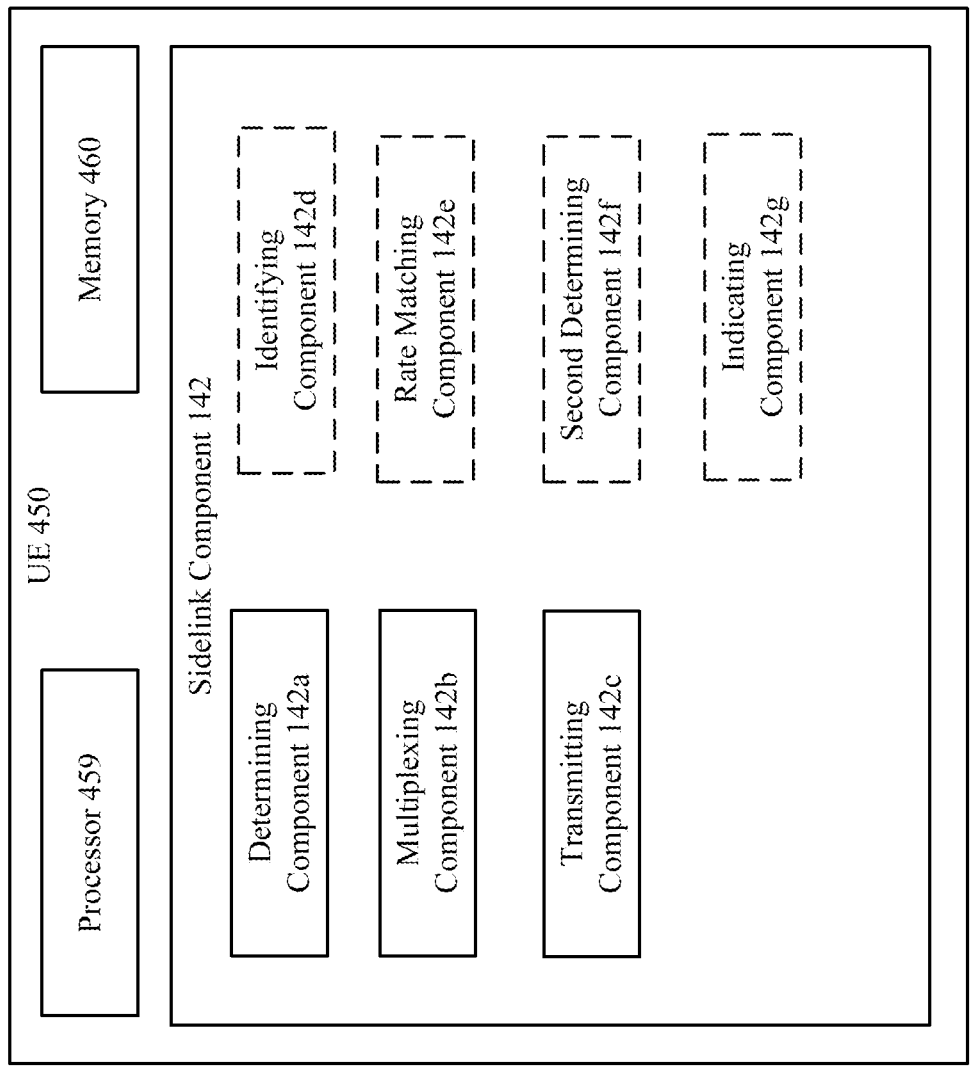
FIG. 11 is a block diagram of a UE, in accordance with examples of the technology disclosed herein.

Referring to FIG. 11, and continuing to refer to prior figures for context, another representation of the UE 450 (such as UE 104a) for wireless communication of FIG. 4 is shown, in accordance with examples of the technology disclosed herein. UE 450 includes sidelink component 142, controller/processor 459, and memory 460, as described in conjunction with FIG. 4 above. Sidelink component 142 includes determining component 142a. In some examples, the determining component 142a determines that an OCB constraint for the slot across the channel will not be met with the resource element allocation. Accordingly, determining component 142a may provide means for determining that an OCB constraint for the slot across the channel will not be met with the resource element allocation.

In response to determining that an OCB constraint for the slot across the channel will not be met with the resource element allocation, the UE multiplexes a reference signal (RS) across the symbols occupied by the S-SSB in a plurality of resource blocks of the channel not occupied by the S-SSB to meet the OCB constraint—Block 620.

Figure 7:
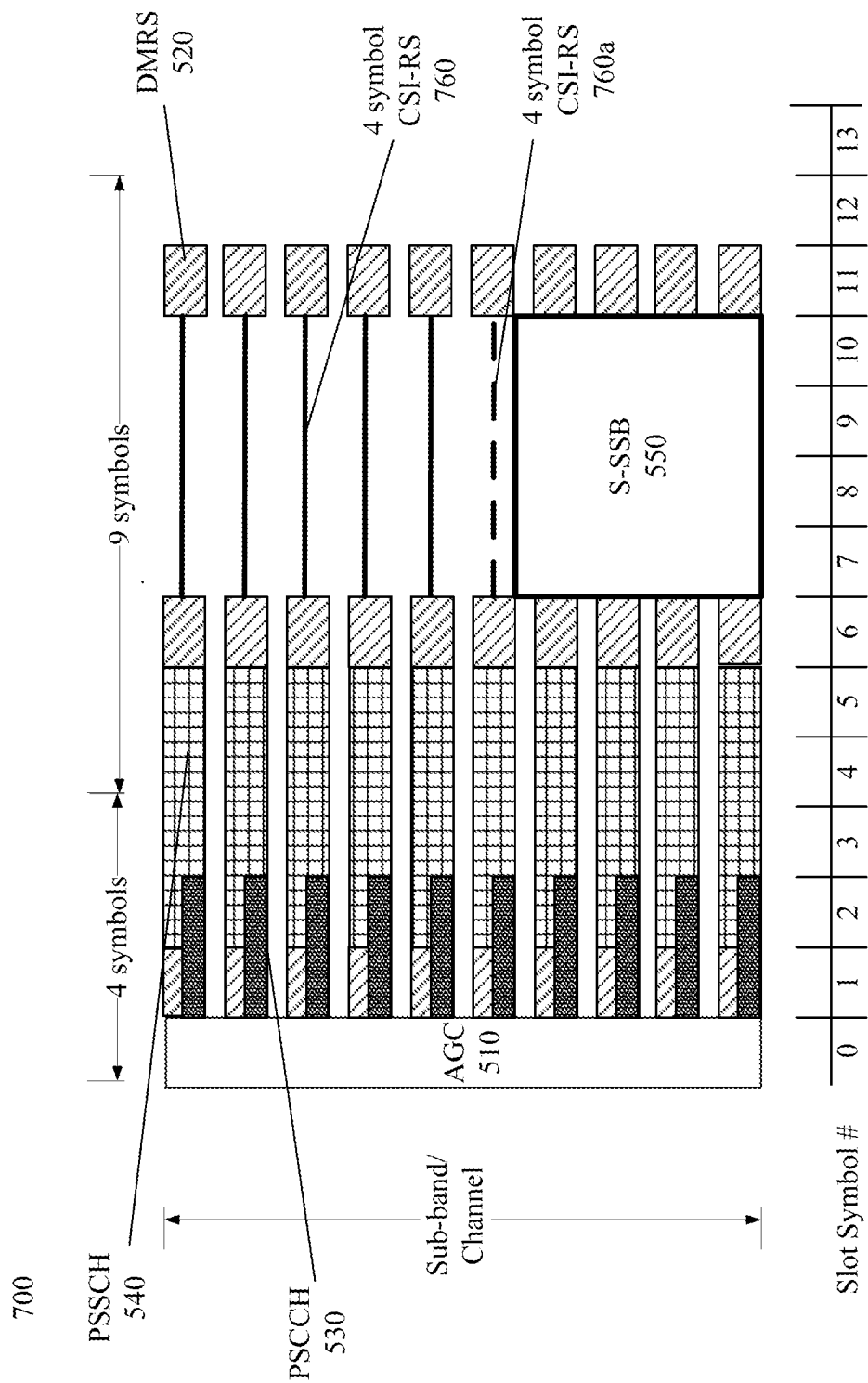
FIG. 7 is a diagram illustrating a wireless communication slot, in accordance with examples of the technology disclosed herein.

In the continuing example, and referring to FIG. 7 while continuing to refer to prior figures for context, UE 104a multiplexes a four (4) symbol CSI-RS across the symbols occupied by S-SSB 550 to help meet the OCB constraint. In the continuing example, the CSI-RS waveform is a stitched interlaced CSI-RS single-symbol waveform repeated in the unoccupied RBs of the symbols occupied by the S-SSB 550. One advantage of this approach is that using four contiguous CSI-RS symbols helps maintain phase continuity across the symbols. Per CSI-RS resource, the CSI-RS could be comb-12 (as shown, 1 RE per RB per symbol), comb-6, or comb-3. The subcarrier component 760a of the CSI-RS 760 may be omitted if power spectral density (PSD) concerns are implicated. If CSI-RS is limited to one or two RB-sets, the minimum RBs constraint of CSI-RS (24 RBs) should be removed, over-ridden, or disabled. The CSI-RS transmission also can be wideband (across multiple contiguous RB sets).

In some examples, the slot can include a CSI-RS request in SCI to trigger 4 symbol CSI-RS to transmit along with S-SSB to fulfill the OCB requirement. If there is no data to multiplex with SSB or the TB is too small, the transmitter can trigger the 4 symbol CSI-RS transmission via SCI. The CSI-RS request in SCI-2 can be used to indicate the CSI-RS set which contains 4 continuous CSI-RS resources (in time) to be transmitted.

Relatedly, a CSI-RS amplitude scaling factor can determined based on the PSSCH amplitude scaling factor assuming SSB puncturing. First, the UE determines a PSSCH amplitude scaling factor for later CSI-RS transmission assuming S-SSB multiplexing and PSSCH REs punctured by S-SSB. The PSSCH amplitude scaling factor here may be smaller than the PSSCH amplitude scaling factor for the actual PSSCH transmission before the S-SSB symbols as the total transmit power is distributed among CSI-RS/PSSCH and S-SSB The combined transmit power of S-SSB/CSI-RS should not exceed the earlier PSCCH/PSSCH power, but may not need to be equal if the transmission of PSSCH is not resumed after S-SSB symbols. If no PSSCH REs are transmitted along with CSI-RS REs, the ratio of CSI-RS to PSSCH REs can be adjust to power boost the CSI-RS transmission.

To avoid complicated rules for determining transmit power for the CSI-RS, one can further limit CSI-RS allocation to one interlace to remove amplitude scaling factor's dependency on RB allocation, e.g., the ratio of transmit power among S-SSB and CSI-RS is fixed. Additionally, one can puncture the CSI-RS interlace RB right next to SSB, e.g., to avoid per MHz PSD limit complication. For example, a 20 RB S-SSB overlaps with 4 RBs from an interlaces CSI-RS (sub-carrier spacing=30 KHz) and the adjacent interlace RBs are separated by 1.8 MHz. If one punctures the interlace RB right next to the 20-RB S-SSB, then the CSI-RS RB is at least 1.8 MHz apart from the SSB RBs, e.g., the per MHz PSD limit can be met.

Referring again to FIG. 11, and continuing to refer to prior figures for context, Sidelink component 142 includes multiplexing component 142b. In some examples, the multiplexing component 142b multiplexes a reference signal (RS) across the symbols occupied by the S-SSB in a plurality of resource blocks of the channel not occupied by the S-SSB to meet the OCB constraint. Accordingly, multiplexing component 142b may provide means for multiplexing a reference signal (RS) across the symbols occupied by the S-SSB in a plurality of resource blocks of the channel not occupied by the S-SSB to meet the OCB constraint.

Referring again to FIG. 6, the UE then transmits the slot with the S-SSB and the multiplexed RS—Block 630. In the continuing example, UE 104a transmits the slot with the S-SSB 550 and the multiplexed CSI-RS 760.

Referring again to FIG. 11, and continuing to refer to prior figures for context, Sidelink component 142 includes transmitting component 142c. In some examples, the transmitting component 142c transmits the slot with the S-SSB and the multiplexed RS. Accordingly, transmitting component 142c may provide means for transmitting the slot with the S-SSB and the multiplexed RS.

In some other examples, the RS is a Tracking RS (TRS). In some such examples, multiplexing includes allocating a given single-symbol TRS with a given subcarrier pattern in each of the symbols occupied by the S-SSB. In some such examples, the single-symbol TRS is a comb-4 pattern TRS.

If the transmitter has no data to transmit in a slot containing S-SSB, the UE can multiplex a tracking reference signal (TRS) waveform with S-SSB 550 symbols to fulfill the OCB constraint. The TRS has wider bandwidth than S-SSB and can help the receiver to update its time/frequency loops. In such examples, four contiguous TRS symbols can be multiplexed with SSB in frequency. Instead of two TRS per slot, a four contiguous TRS symbol waveform is needed to maintain phase continuity. Such a TRS can be comb-4 as in legacy, and can be triggered via SCI-1 or SCI-2. If there are no data REs, the SCI-2 REs are rate matched to fill the gap between the original SCI-2 and S-SSB 550 (as described elsewhere herein). Similarly, the SCI-1 can indicate the SCI-2 rate matching behavior.

Figure 8:
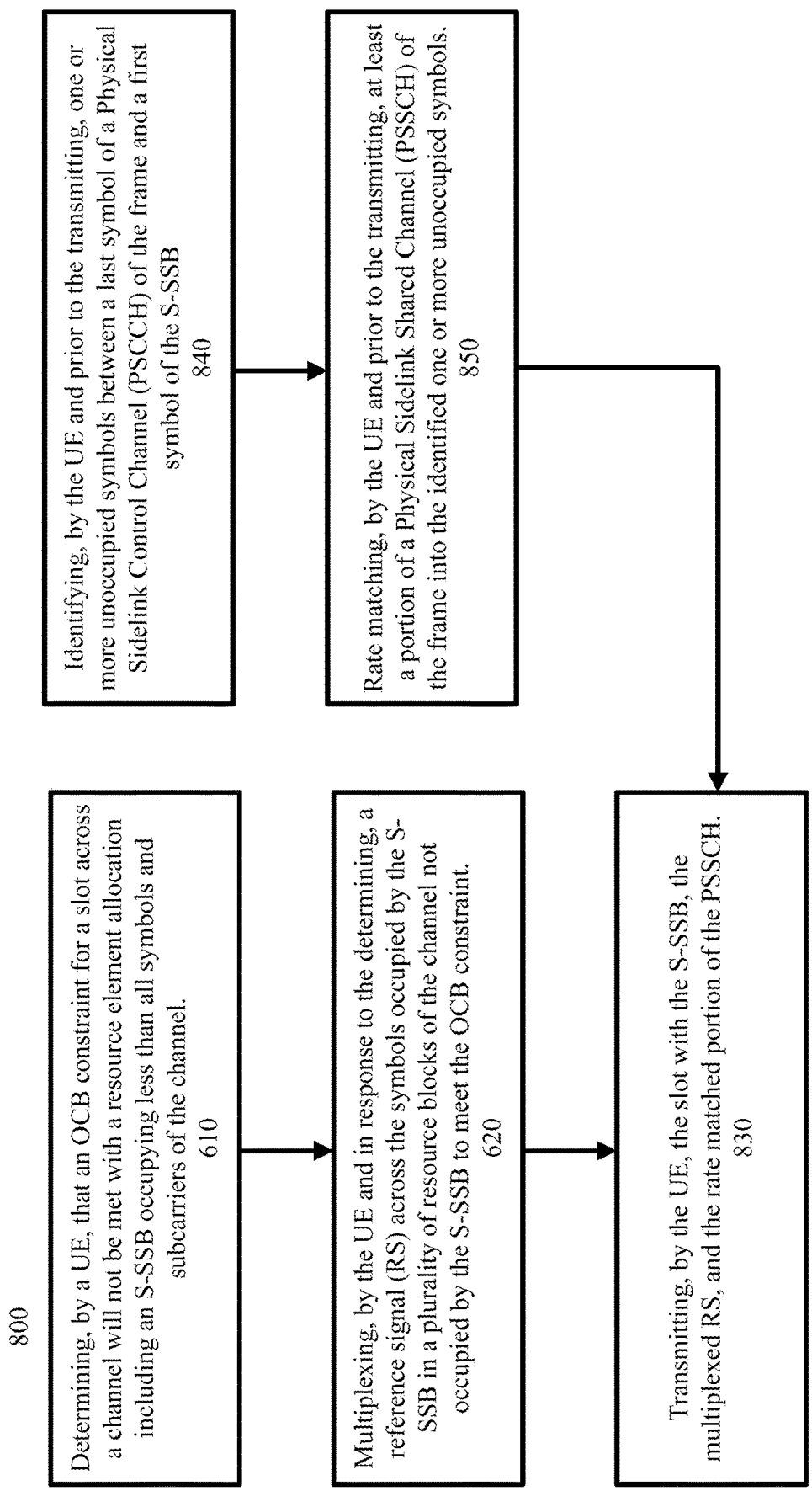
FIG. 8 is a flow diagram illustrating methods of wireless communication, in accordance with examples of the technology disclosed herein.

The TRS receiver algorithm can use the 1st and the 4th symbol TRS and treat the rest of the symbols in the middle as padding to maintain the phase continuity. The TRS can be wideband (across multiple contiguous RB sets) as indicated by Y-bit FDRA in SCI-1 or in the same RB-set where SSB is located. This is to improve the timing resolution of TRS Referring to FIG. 8, and continuing to refer to prior figures for context, methods 800 of wireless communication are show, in accordance with examples of the technology disclosed herein. In such examples, Block 610 and 620 are performed as described above in connection with FIG. 6 and FIG. 7. In such methods 800, the UE identifies, prior to the transmitting, one or more unoccupied symbols between a last symbol of a Physical Sidelink Control Channel (PSCCH) of the frame and a first symbol of the S-SSB—Block 840.

Figure 9:
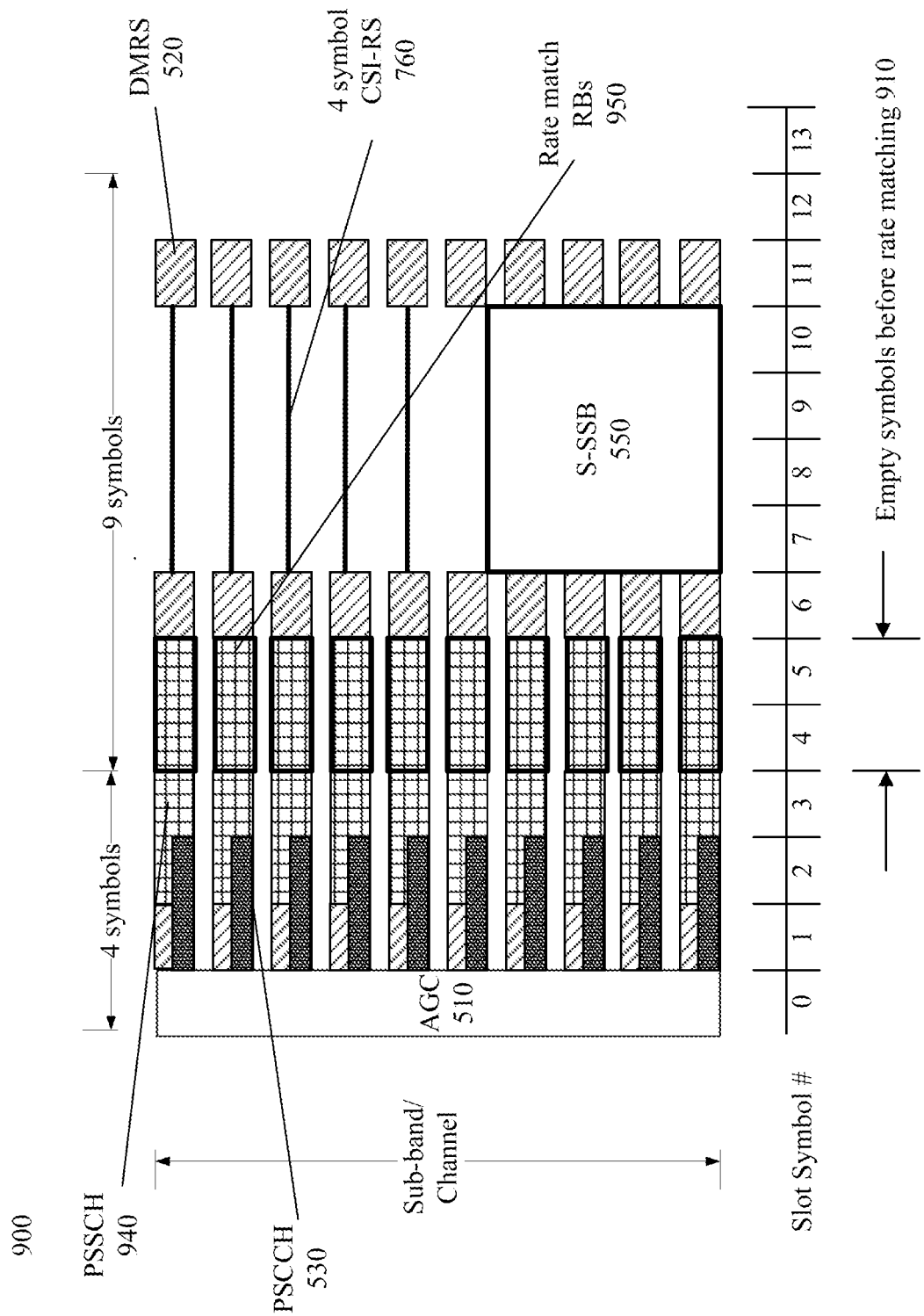
FIG. 9 is a diagram illustrating a wireless communication slot, in accordance with examples of the technology disclosed herein.

In the continuing example, and referring to FIG. 9 showing slot 900, while continuing to refer to prior figures for context, PSSCH 940 contains only SCI-2 (or some small number of data TBs) and extends only to symbol #3, leaving a gap of empty symbols 910 until DMRS 520 in symbol #7 (not to mention any REs left empty by DMRS 520 in symbol #7). For SL operation in unlicensed spectrum, the transmitter UE may need to perform a listen-before-talk (LBT) for S-SSB 550 transmission, e.g., because of the empty symbols #4 and #5. As PSCCH 530 and SCI-2 (part of PSSCH 940) are transmitted to trigger/schedule S-SSB 550 transmission or reserve resources for S-SSB transmission. If data is multiplexed up to S-SSB 550, there is gap between SCI-2 to S-SSB 550 transmission, but if there are little or no data REs to transmit in PSSCH 940, a gap between PSCCH 940/SCI-2 and S-SSB 550 will require the transmitter to perform additional LBT for the S-SSB 550 transmission. In the continuing example UE 104 identifies symbol #4 and symbol #5 as unoccupied.

Referring again to FIG. 11, and continuing to refer to prior figures for context, Sidelink component 142 optionally includes identifying component 142d. In some examples, the identifying component 142d identifies, prior to the transmitting, one or more unoccupied symbols between a last symbol of a Physical Sidelink Control Channel (PSCCH) of the frame and a first symbol of the S-SSB. Accordingly, identifying component 142d may provide means for identifying, prior to the transmitting, one or more unoccupied symbols between a last symbol of a Physical Sidelink Control Channel (PSCCH) of the frame and a first symbol of the S-SSB.

Referring again to FIG. 8, the UE rate matches, prior to the transmitting, at least a portion of a Physical Sidelink Shared Channel (PSSCH) of the frame into the identified one or more unoccupied symbols—Block 850. In the continuing example, UE 104a rate matches the SCI-2 part of PSSCH 940 (shown as "Rate match RBs 950") to fill the gap btw PSCCH 940 and S-SSB 550 symbols. Such rate matching may include unoccupied RBs/REs in DMRS 520 symbol #6, and rate matching around S-SSB 550 (e.g., into symbols #12 and #13). In some examples, one can define a mini-slot before the S-SSB 550. For the case with no data, SCI-2 can be rate matched to the unused RBs in the last symbol of SCI-2 mapping, in part to maintain phase continuity of SCI-2. SCI-2 also can be rate matched around the 1st PSSCH DMRS 520 to the symbol before the S-SSB 550 or the last symbol of S-SSB 550. If rate matched to the symbol before S-SSB 550, phase continuity of SCI-2, CSI-RS 760 and S-SSB 550 can be maintained. If rate matched to the last symbol of S-SSB 550, phase continuity of SCI-2 is a concern unless power boost/de-boost is implemented or SCI-2 has full interlace allocation.

In examples with small data TBs in PSSCH 940 that do not close the gap to at least the second DMRS 520, the UE can rate match the small TB portions of such PSSCH 940 in the same manner. For small TB case, the UE can rate match data to the end of the mini-slot; SCI-2 rate matching is as usual. Data REs are rate matched after SCI-2 to the symbol before the S-SSB 550 or at least the last symbol of S-SSB 550. If rate matched to the symbol before S-SSB 550, phase continuity of data, CSI-RS and SSB is maintained. If rate matched to at least the last symbol of SSB, phase continuity of data is a concern unless power boost/de-boost is implemented or data has full interlace allocation. For the big TB case, one can rate match data to the full slot and around S-SSB 550.

Note that the S-SSB 550 symbol location depends on the number of DMRS 520 in the slot, e.g., S-SSB 550 is located in symbols #6/7/8/9 for two DMRS, and in symbols #7/8/9/10 for three DMRS. A UE 104a transmitter can use the same DMRS 520 pattern for all its S-SSB 550 instances. In a low mobility case, the UE 104a transmitter can use the two-DMRS pattern of data transmission and should use and indicate the two-DMRS pattern in all S-SSB 550 instances. The point is to keep the S-SSB 550 location consistent across S-SSB instances 550. In high mobility case, the UE 104a transmitter can use a three-DMRS pattern of data transmission. When the SCI-2 or small TB is rate matched to the symbol before S-SSB 550 in the three-DMRS case, the last DMRS may be dropped for transmission and the receiver will not use it for channel estimation.

Referring again to FIG. 11, and continuing to refer to prior figures for context, Sidelink component 142 optionally includes rate matching component 142e. In some examples, the rate matching component 142e rate matches, by the UE and prior to the transmitting, at least a portion of a Physical Sidelink Shared Channel (PSSCH) of the frame into the identified one or more unoccupied symbols. Accordingly, rate matching component 142e may provide means for rate matching, by the UE and prior to the transmitting, at least a portion of a Physical Sidelink Shared Channel (PSSCH) of the frame into the identified one or more unoccupied symbols.

Referring again to FIG. 8, the UE transmits the slot with the S-SSB, the multiplexed RS, and the rate matched portion of the PSSCH—Block 830. In the continuing example, UE 104a transmits the slot as shown in FIG. 9.

Figure 10:
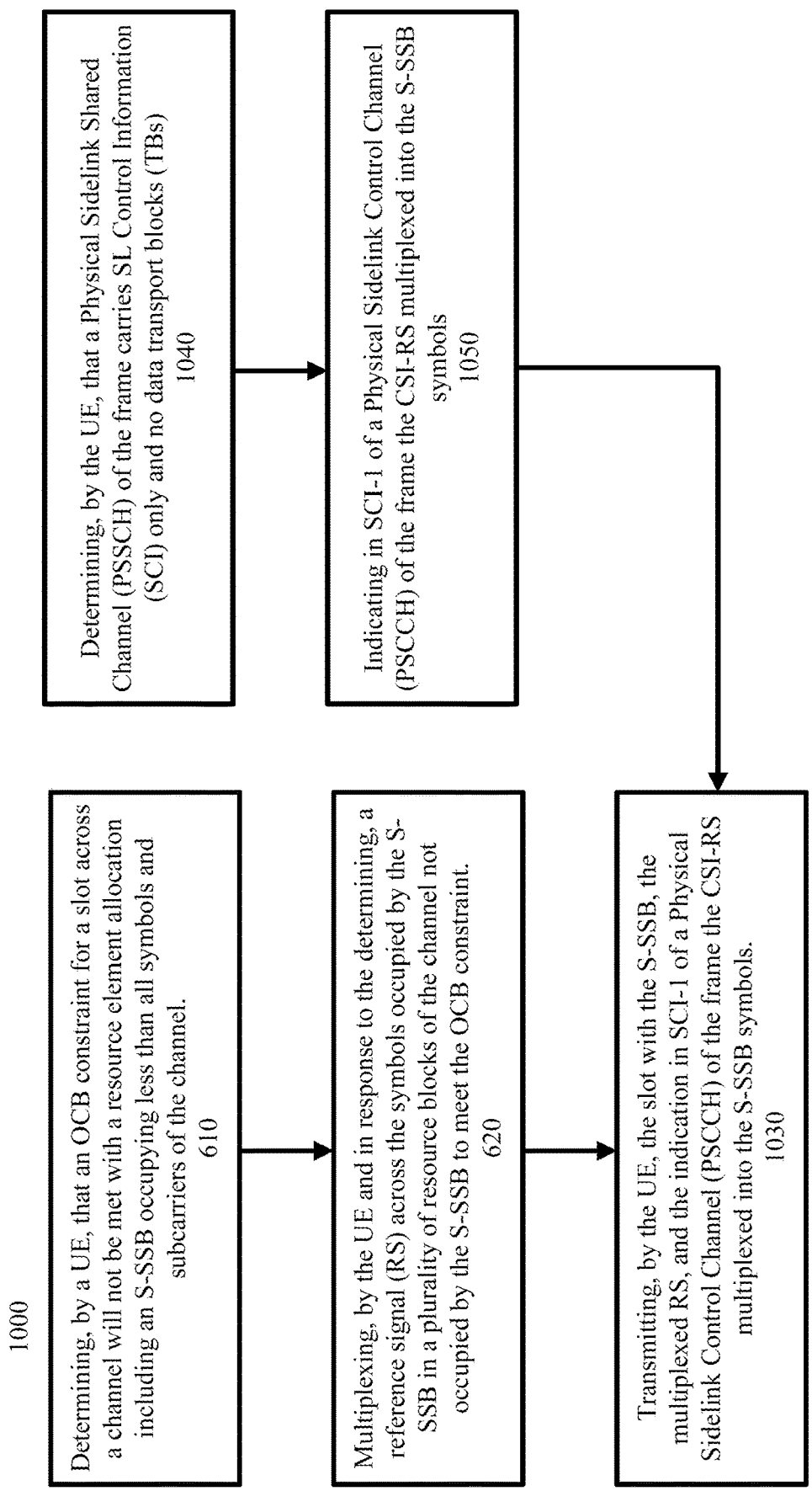
FIG. 10 is a flow diagram illustrating methods of wireless communication, in accordance with examples of the technology disclosed herein.

Referring to FIG. 10, and continuing to refer to prior figures for context, methods 1000 of wireless communication are show, in accordance with examples of the technology disclosed herein. In such methods 1000, Block 610 and 620 are performed as described above in connection with FIG. 6 and FIG. 7. In such methods 1000 prior to the transmission, the UE determines that a Physical Sidelink Shared Channel (PSSCH) of the frame carries SL Control Information (SCI) only and no data transport blocks (TBs)—Block 1040.

The SCI-1 in PSCCH 530 reserves the S-SSB 550 slots and indicates the DMRS 520 pattern which determines the S-SSB 550 symbol locations. For example, for two-DMRS, 1_d=11/12/13, S-SSB 550 can be symbol #5/6/7/8; and for three-DMRS and 1_d=13, S-SSB 550 can be at symbol #7/8/9/10. The SCI-1/SCI-2 (SCI-2 preferred) can indicate the presence of S-SSB 550, e.g., by providing a relative S-SSB bitmap for wideband to indicate the RB-sets where the S-SSB 550 are present. A reference signal (RS) config indication in SCI-1, i.e., no data but the RS, can help the receiver to understand the SCI-2 RE mapping before decoding SCI-2 and not using the 3rd DMRS for channel estimation if three-DMRS are indicated in SCI-1. SCI-1 can be used to indicate the reference signal, e.g., CSI-RS, config in the SSB slot if there is no data scheduled. Multiplexing an RS may need special handling on SCI-2/PSSCH rate-matching or the DMRS/SSB. So, it is best to indicate the RS config in SCI-1. One can reuse reserved SCI-2 format field codepoints, beta offset field or other SCI-1 fields from NR. The SCI request field in SCI-2 can still be used to indicate in CSI-RS transmission (to differentiate from TRS).

The CSI-RS symbol location depends on where S-SSB 550 is transmitted. CSI-RS frequency resources either can be in the RB set where S-SSB 550 is transmitted or across multiple contiguous RB-sets as indicated in Y-bit FDRA of SCI-1. The interlace, number of interlaces, and the RB sets for the CSI-RS can be signaled via FDRA in SCI-1 The comb number and comb offset of CSI-RS are configured in RRC.

Referring again to FIG. 11, and continuing to refer to prior figures for context, Sidelink component 142 optionally includes second determining component 142f. In some examples, the determining component 142f determines that a Physical Sidelink Shared Channel (PSSCH) of the frame carries SL Control Information (SCI) only and no data transport blocks (TBs). Accordingly, determining component 142f may provide means for determining that a Physical Sidelink Shared Channel (PSSCH) of the frame carries SL Control Information (SCI) only and no data transport blocks (TBs).

Referring again to FIG. 10, the UE indicates in SCI-1 of a Physical Sidelink Control Channel (PSCCH) of the frame the CSI-RS multiplexed into the S-SSB symbols—Block 1050. Referring again to FIG. 11, and continuing to refer to prior figures for context, Sidelink component 142 optionally includes indicating component 142g. In some examples, the indicating component 142g indicates in SCI-1 of a Physical Sidelink Control Channel (PSCCH) of the frame the CSI-RS multiplexed into the S-SSB symbols. Accordingly, indicating component 142g may provide means for indicating in SCI-1 of a Physical Sidelink Control Channel (PSCCH) of the frame the CSI-RS multiplexed into the S-SSB symbols.

Referring again to FIG. 10, the UE transmits the slot with the S-SSB, the multiplexed RS, and the indication in SCI-1 of a Physical Sidelink Control Channel (PSCCH) of the frame the CSI-RS multiplexed into the S-SSB symbols—Block 1030.

The following examples are illustrative only and aspects thereof may be combined with aspects of other embodiments or teaching described herein, without limitation. The technology disclosed herein includes method, apparatus, and computer-readable media including instructions for wireless communication. Such technology finds use in the context of a slot of a sidelink (SL) communication frame of a user equipment (UE). The slot is configured with a resource element allocation comprising an SL synchronization signal block (S-SSB) occupying a plurality of less than all symbols of the slot, and a plurality of less than all subcarriers of a channel of the slot.

Example 1 includes methods, apparatuses, and computer readable media for wireless communication, in which, the UE determines that an occupied channel bandwidth (OCB) constraint for the slot across the channel will not be met with the resource element allocation. The UE then multiplexes, in response to the determining, a reference signal (RS) across the symbols occupied by the S-SSB in a plurality of resource blocks of the channel not occupied by the S-SSB to meet the OCB constraint. The UE then transmits the slot with the S-SSB and the multiplexed RS.

Example 2 includes the Example 1, wherein the channel is in an unlicensed frequency band. Example 3 includes any one or more of Example 1 and Example 2, wherein the S-SSB is configured across four (4) contiguous symbols and one of (i) eleven resource blocks (RBs) in frequency and (ii) twenty RBs in frequency. Example 4 includes any one or more of Example 1-Example 3, wherein the RS is a Channel Status Information RS (CSI-RS). Example 5 includes any one or more of Example 1-Example 4, wherein multiplexing includes allocating one CSI-RS to one resource per symbol occupied by the S-SSB in a plurality of resource blocks of the channel not occupied by the S-SSB. Example 6 includes any one or more of Example 1-Example 5, wherein multiplexing includes allocating a given single-symbol CSI-RS with a given subcarrier pattern in each of the symbols occupied by the S-SSB. Example 7 includes any one or more of Example 1-Example 6, wherein the single-symbol CSI-RS is one of a comb-12, comb-6, comb-4, and comb-3 pattern CSI-RS. Example 8 includes any one or more of Example 1-Example 7, wherein SL Control Information (SCI) of the frame indicates the CSI-RS multiplexed into the S-SSB symbols. Example 9 includes any one or more of Example 1-Example 8, wherein the S-SSB punctures a Physical Sidelink Shared Channel (PSSCH) of the frame and an amplitude scaling factor is applied to the CSI-RS based on an amplitude scaling factor of the PSSCH.

Example 10 includes any one or more of Example 1-Example 9, wherein the UE identifies, prior to the transmitting, one or more unoccupied symbols between a last symbol of a Physical Sidelink Control Channel (PSCCH) of the frame and a first symbol of the S-SSB. In such examples, the UE rate matches, prior to the transmitting, at least a portion of a Physical Sidelink Shared Channel (PSSCH) of the frame into the identified one or more unoccupied symbols. In such examples, transmitting the slot further comprises transmitting the slot with the rate matched at least a portion of the PSSCH.

Example 11 includes any one or more of Example 1-Example 10, wherein, prior to transmitting, the UE determines that a Physical Sidelink Shared Channel (PSSCH) of the frame carries SL Control Information (SCI) only and no data transport blocks (TBs). In such examples, the UE indicates in SCI-1 of a Physical Sidelink Control Channel (PSCCH) of the frame the CSI-RS multiplexed into the S-SSB symbols. In such examples, transmitting the slot further includes transmitting the slot with the indication in SCI-1 of a Physical Sidelink Control Channel (PSCCH) of the frame the CSI-RS multiplexed into the S-SSB symbols.

Example 12 includes any one or more of Example 1-Example 10, wherein, the RS is a Tracking RS (TRS). Example 13 includes any one or more of Example 1-Example 12, wherein multiplexing comprises allocating a given single-symbol TRS with a given subcarrier pattern in each of the symbols occupied by the S-SSB. Example 14 includes any one or more of Example 1-Example 13, wherein the single-symbol TRS is a comb-4 pattern TRS.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A wireless communication method, comprising:
   in a slot of a sidelink (SL) communication frame of a user equipment (UE), the slot configured with a resource element allocation comprising an SL synchronization signal block (S-SSB) occupying a plurality of less than all symbols of the slot, and a plurality of less than all subcarriers of a channel of the slot:
      determining, by the UE, that an occupied channel bandwidth (OCB) constraint for the slot across the channel will not be met with the resource element allocation;
      multiplexing, by the UE and in response to the determining, a reference signal (RS) across the symbols occupied by the S-SSB in a plurality of resource blocks of the channel not occupied by the S-SSB to meet the OCB constraint; and
      transmitting, by the UE, the slot with the S-SSB and the multiplexed RS.

2. The method of claim 1, wherein the channel is in an unlicensed frequency band.

3. The method of claim 1, wherein the S-SSB is configured across four (4) contiguous symbols and one of (i) eleven resource blocks (RBs) in frequency and (ii) twenty RBs in frequency.

4. The method of claim 1, wherein the RS is a Channel Status Information RS (CSI-RS).

5. The method of claim 4, wherein multiplexing comprises allocating one CSI-RS to one resource per symbol occupied by the S-SSB in a plurality of resource blocks of the channel not occupied by the S-SSB.

6. The method of claim 4, wherein multiplexing comprises allocating a given single-symbol CSI-RS with a given subcarrier pattern in each of the symbols occupied by the S-SSB.

7. The method of claim 6, wherein the single-symbol CSI-RS is one of a comb-12, comb-6, comb-4, and comb-3 pattern CSI-RS.

8. The method of claim 4, wherein SL Control Information (SCI) of the frame indicates the CSI-RS multiplexed into the S-SSB symbols.

9. The method of claim 4, wherein:
   the S-SSB punctures a Physical Sidelink Shared Channel (PSSCH) of the frame and an amplitude scaling factor is applied to the CSI-RS based on an amplitude scaling factor of the PSSCH.

10. The method of claim 1, further comprising:
    identifying, by the UE and prior to the transmitting, one or more unoccupied symbols between a last symbol of a Physical Sidelink Control Channel (PSCCH) of the frame and a first symbol of the S-SSB; and
    rate matching, by the UE and prior to the transmitting, at least a portion of a Physical Sidelink Shared Channel (PSSCH) of the frame into the identified one or more unoccupied symbols,
    wherein transmitting the slot further comprises transmitting the slot with the rate matched at least a portion of the PSSCH.

11. The method of claim 1, further comprising:
    prior to transmitting:
      determining, by the UE, that a Physical Sidelink Shared Channel (PSSCH) of the frame carries SL Control Information (SCI) only and no data transport blocks (TBs); and
      indicating, by the UE, in SCI-1 of a Physical Sidelink Control Channel (PSCCH) of the frame the RS multiplexed into the S-SSB symbols,
    wherein transmitting the slot further comprises transmitting the slot with the indication in SCI-1 of a Physical Sidelink Control Channel (PSCCH) of the frame the RS multiplexed into the S-SSB symbols.

12. The method of claim 1, wherein the RS is a Tracking RS (TRS).

13. The method of claim 12, wherein multiplexing comprises allocating a given single-symbol TRS with a given subcarrier pattern in each of the symbols occupied by the S-SSB.

14. The method of claim 13, wherein the single-symbol TRS is a comb-4 pattern TRS.

15. An apparatus for wireless communication, comprising:
    a memory; and at least one processor coupled to the memory, the memory including instructions executable by the at least one processor to cause the apparatus to:
in a slot of a sidelink (SL) communication frame of a user equipment (UE), the slot configured with a resource element allocation comprising an SL synchronization signal block (S-SSB) occupying a plurality of less than all symbols of the slot, and a plurality of less than all subcarriers of a channel of the slot:
determine, by the UE, that an occupied channel bandwidth (OCB) constraint for the slot across the channel will not be met with the resource element allocation;
multiplex, by the UE and in response to the determining, a reference signal (RS) across the symbols occupied by the S-SSB in a plurality of resource blocks of the channel not occupied by the S-SSB to meet the OCB constraint; and
transmit, by the UE, the slot with the S-SSB and the multiplexed RS.

16. The apparatus of claim 15, wherein the channel is in an unlicensed frequency band.

17. The apparatus of claim 15, wherein the S-SSB is configured across four (4) contiguous symbols and one of (i) eleven resource blocks (RBs) in frequency and (ii) twenty RBs in frequency.

18. The apparatus of claim 15, wherein the RS is a Channel Status Information RS (CSI-RS).

19. The apparatus of claim 18, wherein multiplexing comprises allocating one CSI-RS to one resource per symbol occupied by the S-SSB in a plurality of resource blocks of the channel not occupied by the S-SSB.

20. The apparatus of claim 18, wherein multiplexing comprises allocating a given single-symbol CSI-RS with a given subcarrier pattern in each of the symbols occupied by the S-SSB.

21. The apparatus of claim 20, wherein the single-symbol CSI-RS is one of a comb-12, comb-6, comb-4, and comb-3 pattern CSI-RS.

22. The apparatus of claim 18, wherein SL Control Information (SCI) of the frame indicates the CSI-RS multiplexed into the S-SSB symbols.

23. The apparatus of claim 18, wherein:
the S-SSB punctures a Physical Sidelink Shared Channel (PSSCH) of the frame and an amplitude scaling factor is applied to the CSI-RS based on an amplitude scaling factor of the PSSCH.

24. A non-transitory computer-readable medium storing processor-executable code, the code when read and executed by at least one processor of user equipment (UE), causes the UE to:
in a slot of a sidelink (SL) communication frame of the UE, the slot configured with a resource element allocation comprising an SL synchronization signal block (S-SSB) occupying a plurality of less than all symbols of the slot, and a plurality of less than all subcarriers of a channel of the slot:
determine, by the UE, that an occupied channel bandwidth (OCB) constraint for the slot across the channel will not be met with the resource element allocation;
multiplex, by the UE and in response to the determining, a reference signal (RS) across the symbols occupied by the S-SSB in a plurality of resource blocks of the channel not occupied by the S-SSB to meet the OCB constraint; and
transmit, by the UE, the slot with the S-SSB and the multiplexed RS.

25. The non-transitory computer-readable medium of claim 24, the code when read and executed by at least one processor of the UE, further causes the UE to:
identify, prior to the transmitting, one or more unoccupied symbols between a last symbol of a Physical Sidelink Control Channel (PSCCH) of the frame and a first symbol of the S-SSB; and
rate match, prior to the transmitting, at least a portion of a Physical Sidelink Shared Channel (PSSCH) of the frame into the identified one or more unoccupied symbols,
wherein transmitting the slot further comprises transmitting the slot with the rate matched at least a portion of the PSSCH.

26. The non-transitory computer-readable medium of claim 24, the code when read and executed by at least one processor of the UE, further causes the UE to:
prior to transmitting:
determine that a Physical Sidelink Shared Channel (PSSCH) of the frame carries SL Control Information (SCI) only and no data transport blocks (TBS); and
indicate in SCI-1 of a Physical Sidelink Control Channel (PSCCH) of the frame the RS multiplexed into the S-SSB symbols,
wherein transmitting the slot further comprises transmitting the slot with the indication in SCI-1 of a Physical Sidelink Control Channel (PSCCH) of the frame the RS multiplexed into the S-SSB symbols.

27. The non-transitory computer-readable medium of claim 24, wherein the RS is a Tracking RS (TRS).

28. The non-transitory computer-readable medium of claim 27, wherein multiplexing comprises allocating a given single-symbol TRS with a given subcarrier pattern in each of the symbols occupied by the S-SSB.

29. The non-transitory computer-readable medium of claim 28, wherein the single-symbol TRS is a comb-4 pattern TRS.

30. An apparatus for wireless communications, comprising:
in a slot of a sidelink (SL) communication frame of a user equipment (UE), the slot configured with a resource element allocation comprising an SL synchronization signal block (S-SSB) occupying a plurality of less than all symbols of the slot, and a plurality of less than all subcarriers of a channel of the slot:
means for determining, by the apparatus, that an occupied channel bandwidth (OCB) constraint for the slot across the channel will not be met with the resource element allocation;
means for multiplexing, by the apparatus and in response to the determining, a reference signal (RS) across the symbols occupied by the S-SSB in a plurality of resource blocks of the channel not occupied by the S-SSB to meet the OCB constraint; and
means for transmitting, by the apparatus, the slot with the S-SSB and the multiplexed RS.

* * * * *